United States Patent [19]
Palmer

[11] Patent Number: 6,054,161
[45] Date of Patent: *Apr. 25, 2000

[54] MEAT PROCESSING IN A CONTROLLED GAS ENVIRONMENT

[75] Inventor: Roger Keith Palmer, Auckland, New Zealand

[73] Assignee: Tenderland Limited, Auckland, New Zealand

[*] Notice: This patent issued on a continued prosecution application filed under 37 CFR 1.53(d), and is subject to the twenty year patent term provisions of 35 U.S.C. 154(a)(2).

[21] Appl. No.: 08/547,780

[22] Filed: Oct. 25, 1995

[30] Foreign Application Priority Data

Oct. 25, 1994 [NZ] New Zealand .............................. 264771

[51] Int. Cl.[7] .................................. A23B 4/16; A23L 1/31
[52] U.S. Cl. .......................... 426/312; 426/129; 426/316; 426/404; 426/418; 426/641
[58] Field of Search ..................................... 426/129, 392, 426/404, 410, 418, 312, 316, 641

[56] References Cited

U.S. PATENT DOCUMENTS

| | | | |
|---|---|---|---|
| 3,851,080 | 11/1974 | Luff et al. | 426/418 X |
| 3,930,040 | 12/1975 | Woodruff | 426/418 X |
| 4,642,239 | 2/1987 | Ferrar et al. | 426/418 X |
| 4,818,548 | 4/1989 | Cheng | 426/418 X |
| 4,992,287 | 2/1991 | Dreano | 426/418 |

FOREIGN PATENT DOCUMENTS

| | | | |
|---|---|---|---|
| 2290153 | 6/1976 | France | 426/418 |
| 393935 | 6/1933 | United Kingdom . | |
| 484195 | 5/1938 | United Kingdom . | |
| 92/10939 | 7/1992 | WIPO | 426/418 |
| WO9317562 | 9/1993 | WIPO . | |
| WO9325082 | 12/1993 | WIPO . | |
| 95/10944 | 4/1995 | WIPO . | |

Primary Examiner—Arthur L. Corbin
Attorney, Agent, or Firm—Birch, Stewart, Kolasch & Birch, LLP

[57] ABSTRACT

A meat treatment method and apparatus for handling, storage, transportation and sale of meat exposes the meat to a controlled gas environment. This environment includes oxygen under pressure in excess of atmospheric wherein the meat is exposed for a predetermined period of time. The method may also includes the step of pre-treating the meat in a substantially anaerobic environment for a sufficient time to achieve a predetermined close down of aerobic bacteria on the meat and suspension of most biochemic effects of oxygen on the meat. Subsequently, the method includes the treating of the meat under aerobic conditions including the step of supplying oxygen under pressure. The method also includes the prepackaging of meat in at least partially gas permeable packaging suitable for use in a retail sale environment, prior to aerobic gas pressure treatment. The method improves shelf life and appearance of meat over a traditionally handled product.

10 Claims, 1 Drawing Sheet

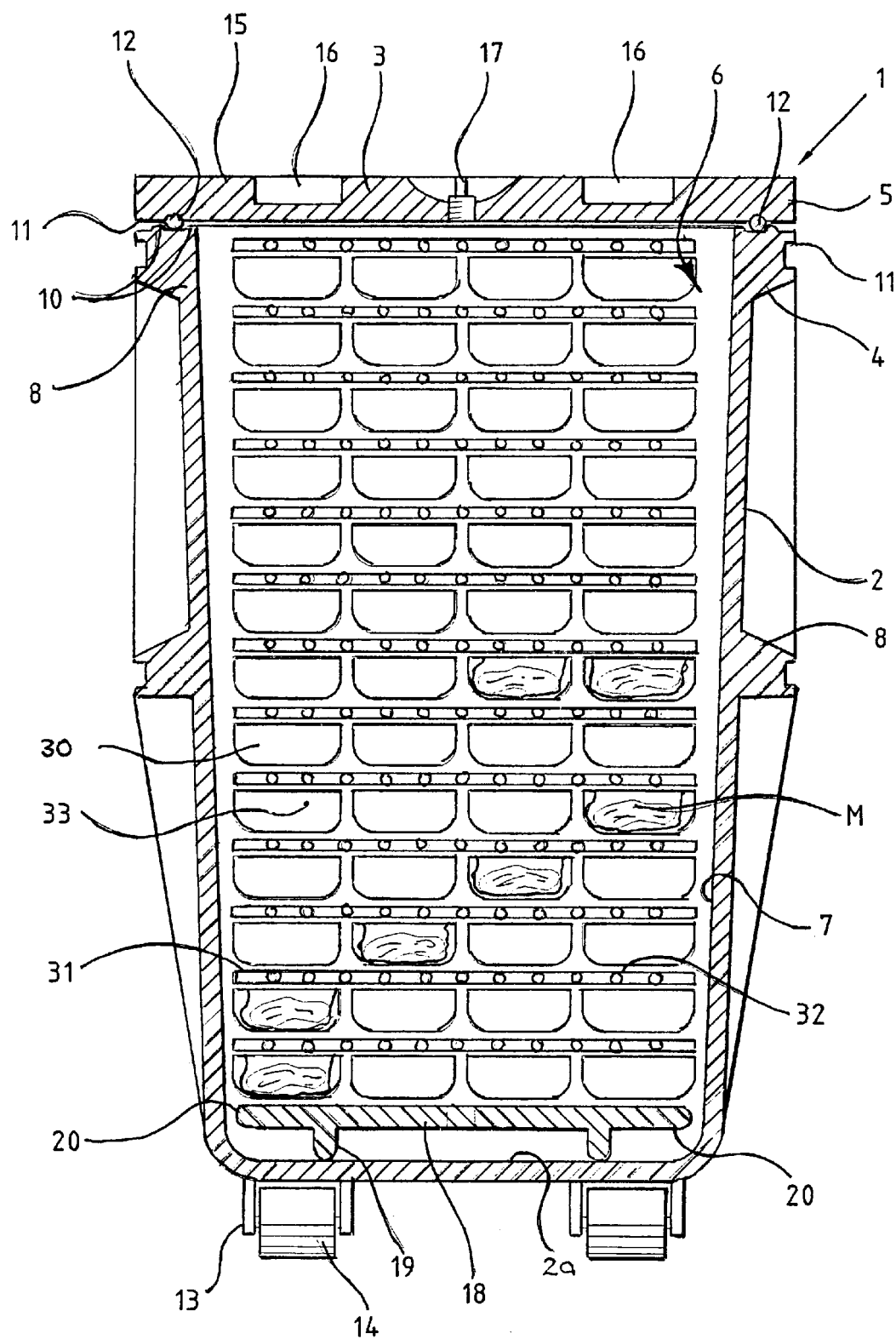

6,054,161

MEAT PROCESSING IN A CONTROLLED GAS ENVIRONMENT

INTRODUCTION

This invention relates to improvements in meat treatment and more particularly to improvements in methods and apparatus for the treatment of meat in handling, storage, transportation and at sale.

Throughout this specification it is to be appreciated that references to "meat" include all forms of meat generally considered to be edible including fish, poultry and offal of all descriptions.

Reference is made in this specification to meat which has been treated in anaerobic conditions. Whilst not essential to the method of this invention, it is to be appreciated that one method and apparatus for providing meat in anaerobic conditions can be that as described in the applicant's patent application under the provisions of the Patent Co-operation Treaty No. PCT/NZ93/00048 under international publication No. WO93/25/082.

BACKGROUND TO THE INVENTION

Historically, the meat industry has, and continues to undergo considerable change. Such change is found not only in methods and apparatus for the treatment of meat, but also in consumer demands, which in turn manifest themselves in demands from retailers and wholesalers.

Increasing consumer demands and regulations relevant to the quality of meat products, particularly at point of sale, together with changes in buying patterns of consumers have lead to the decline of specialist exclusive meat outlets such as butcher shops and the like.

Increased demand for high quality pre-cut and pre-packaged meat sold through supermarkets and non-specialist stores has meant that successful meat producers have had to meet these requirements by offering packaged meat in pre-prepared, ready to cook retail packs and the like.

Significant problems occur in presenting and delivering pre-packaged cuts of meat to consumers under such circumstances. The meat industry is faced with significant costs in meeting the consumer demands as well as high losses by wastage of products through poor shelf life.

One of the factors affecting shelf life of prepared and packaged meat products is the buildup of bacteria on the surface of the meat. Other factors are with colour loss, drip of meat fluids and in extreme cases, deterioration of taste and development of off-odors.

Modified atmosphere packs are of course known, however, in the past these packs have been relatively expensive for meat producers to use and consumers often do not perceive the meat in such packs as fresh.

Further, the packs considerably increase the bulk of the manufactured product and create handling difficulties, particularly as most modified atmosphere packs require a significant volume of gas relative to the meat and in the main, this is generally achieved by providing an upper bubble of plastic film within which the gas is retained, thus leading to significant packaging difficulties, losses through puncturing and the like.

In efficiency terms, it will also be appreciated that a relatively large quantity of gas is required to be supplied to the modified atmosphere packed meat to ensure that at the end of the intended package time, the meat still has adequate gas to retain meat quality and to prevent collapse of the pack. This leads to substantial packing and transportation inefficiencies, particularly where it will be appreciated that in some instances a volume of gas required can equate to the volume of meat housed in a modified atmosphere pack.

Concurrently there is a desire for supermarkets and other non-exclusive product retail organisations to move away from specialist meat handling facilities and staff within the organisation to central preparation of packaged cuts of meat for sale. This move is largely in view of the high cost and inability to dual use such facilities, the attendant hygiene requirements and an inability generally to use butchery staff efficiently.

It has been found in practise that whilst savings can be made utilising a central cutting facility for several retail outlets, offsetting losses occur as a result of the additional time which such central cutting and delivery requires, which inevitably affects available shelf life and leads to many shelf life related problems noted above.

Central cutting additionally creates conditions within the product supply chain where supermarkets can have what are known as "product outages" where stocks of particular products run out before the shelves can be restocked, reducing sale opportunities for the retail outlets.

Consumers perceive the quality of meat at the time of purchase by meat appearance. Hitherto, cuts of meat in prepackaged prepared form often exhibit a fresh bright look for a short period of time after which the effects of ageing become visually apparent. Often the meat quality is still sufficiently high for such meat to be otherwise readily saleable, however, it has been found in practise that the inclusion of packaged meat visually showing effects of age within a display of other meat which is not so affected, can materially detract from the sale of all meat from the display.

Accordingly, there has been a heavy labor need for regular assessment of meat quality by sales staff to regularly monitor shelf life and remove or repackage effected product.

It is thus recognised by the meat industry that an increase in shelf life is highly beneficial to trading economics.

OBJECTS OF THE INVENTION

It is an object of this invention to provide a method of improving the flexibility and efficiency of meat treatment methods, the quality of stored meat (for example, the shelf life and appearance of meat), or to at least come some way in addressing the abovementioned problems or provide the public with a useful choice.

Other objects of this invention will become apparent from the following description which is given by way of one example of the invention.

BROAD DESCRIPTION OF THE INVENTION

According to one aspect of this invention there is provided a method of treatment of meat including the step of exposing the meat to a controlled environment of a predetermined temperature and gas type, holding said gas during a predetermined period time for meat containment in said controlled environment at a pressure in excess of atmospheric.

According to a further aspect of this invention there is provided a method of treatment of meat including the step of exposing the meat to a controlled environment of a predetermined temperature and gas type, holding said gas during a predetermined period time for meat containment in said controlled environment at a pressure in excess of atmospheric, including the step of providing said gas in said controlled environment at pressure levels sufficient to maintain said meat under gas pressure in excess of atmospheric throughout said predetermined period of time.

According to a further aspect of this invention there is provided apparatus for storing meat according to the abovementioned method, including a portable closable containment means for containing said meat during storage and providing the controllable environment.

According to a still further aspect of this invention there is provided meat treated according to the abovementioned method and wherein said meat is at least partially packed in a package where a portion of said package is gas permeable.

Other aspects of this invention will become apparent from the following description.

BRIEF DESCRIPTION OF THE DRAWING

The drawing discloses a substantially cross-sectional side elevation of a typical apparatus in use according to the method of the invention.

DESCRIPTION OF THE INVENTION IN RELATION TO PRESENT EMBODIMENT

The preferred form of the invention will now be described by way of example. Modifications are envisaged and may be incorporated without departing from the scope or spirit of the invention as defined in the appended claims.

To assist in the disclosure of the method of the invention, the preferred form of apparatus used in carrying out the method is also described. It is to be appreciated that this apparatus is in no way limiting and other apparatus may be utilised to carry out the method of the invention.

It is further to be appreciated that throughout this specification and particularly with reference to the embodiment described herein, reference is made to various measurements. This reference is made purely for the purposes of clarity of the description and in relationship to the particular embodiment described. The references are in no way limiting, particularly having regard to the general co-relationship between pressure and time in methods and apparatus for meat treatment.

With reference to the drawing, the apparatus within which the method is used is generally indicated by arrow 1 and incorporates a container having a substantially open-topped container topped body portion 2 and a closure lid 3 engageable thereon to seal between opposing flanges 4 and 5 to close an opening 6 and provide a substantially enclosed chamber 7 within the apparatus 1 within which a charge of meat can be placed for treatment.

In the preferred form of the invention the apparatus 1 is manufactured from a selection of suitable, preferably inert and hygienic materials suitable for food contact, such as certain plastics, metals, stainless steel and the like.

Preferably the container 2 is provided with a pair of spaced apart peripheral ribs 8 outwardly grooved, said ribs acting as "buffer" portions and reinforcement for the container 2 and further, said grooves are provided to facilitate banding of similar containers together using metal strapping and the like, for palatalisation should it be required.

Preferably at least the flange 4 of the container 2 is provided with a pair of spaced apart upwardly directed ribs 10 thereon defining and flanking a sealing face which an endless sealing ring 12 positioning between a groove in the lid 3 flange 5 and the container 2, flange 4, such that upon the lid being urged and held against the container 2 by clamping means or other attachment means, (not shown) and effective fluid type seal between the container 2 and the lid 3 is provided to facilitate the provision of a controlled environment in the chamber 7.

The chamber 7 is provided to accommodate a charge of meat to be processed according to the method described hereinafter.

Preferably an exterior base of the container 2 is provided with lugs 13 thereon for mounting ground wheels 14 to support the container 2. In the preferred form of the invention, preferably six ground wheels 14 are provided. These ground wheels 14 facilitate ready movement of the apparatus in use and furthermore, an upper surface 15 of the lid 3 is arranged with corresponding depressions 16 therein to enable stacking of the containers for transportation.

A valve means 17 is provided to enable controlled gas communication through the container 2 wall. In the preferred form of the invention, the valve means 17 is provided through the lid 3 of the apparatus 1 and is provided in the form of a normally closed valve which is openable on the insertion of a probe and the like.

It will be appreciated the valve means 17 enables controlled communication between an exterior of the apparatus 1 and the chamber 7 when the apparatus 1 is in a closed condition and that the apparatus 1 can provide a readily handleable, moveable controlled environment in which a charge of meat can be stored.

In the preferred form of the invention, the charge of meat placed within the chamber 7 is preferably housed on a support means or false floor 18 having a series of projections 19 on an underside thereof able to impinge a lower floor portion 2a of the container 2 to space the false floor from the base 2a. Further, preferably edge portions 20 of the false floor are spaced from side walls of internal side walls of container 2 so as to enable relatively free passage of gas within the chamber 7.

The apparatus also includes means of stacking a charge of packaged meat to be treated according to the method of the invention. In the preferred form meat M is housed within the chamber 7 in at least partially gas permeable packages 30 suitable for retail sales, preferably formed in food grade plastics material and being preferably covered in thin plastic film wrap 31 according to substantially known techniques.

It will be appreciated that these thin plastic film wrap materials are at least gas permeable to oxygen and carbon dioxide.

Preferably the overall size of the packages 30 and the chamber are so inter-related that efficient placement of the packages 30 can be achieved and a stack of layers within the chamber 7.

In the preferred form, the packages 30 are separated by perforated separator grids 32 for example, formed in a latice of plastics material arranged to conveniently fit within the chamber 7.

The packages 30 preferably provide reasonably structural side walls 33 thereof, able to accommodate stack stress to which the packages 30 are positioned in the chamber 7. Furthermore the packages 30 need be able to withstand the rigours of movement, transportation and the like, without damage or undue compression or crushing of the meat M housed within the packages 30 or the packages themselves.

Preferably the side walls 33 of the packages 30 are provided of a sufficient height to approximately correspond with a preferred height of the cut of meat M housed within the package 30 to enable effective and secure package stacking without crushing and deformation of the meat M.

The preferred method of attachment of the plastic film wrap 31 with the container 30 base is via "cling" wrapping although this is not essential to the invention.

In alternative arrangements of the invention it is proposed that the packages 30 may be housed within the chamber 7 of the container 2 in a removeable supporting frame which is of generally unitary construction and can be inserted into the container 2 to position upright, for example on at least two opposing sides of the chamber 7, said uprights having lugs with which the perforated separated grids 32 can be engaged in the nature of supporting trays.

It will be appreciated that in this alternative assembly, a variety of heights of packages 30 may be accommodated within the chamber 7 and further, the crushing effect described hereinbefore, of packages 30 stacked one upon the other can be avoided.

Further, the alternative supporting arrangement described can provide a basis for placement of larger cuts of meat within the chamber 7, such as that used in so-called "gourmet" packs where in certain instances, the meat may be exposed, in not being enclosed within a package but supported on a suitable tray with or without a thin plastic film wrap which is gas permeable to oxygen and carbon dioxide.

The foregoing physical properties of the assembly are provided by way of background and for assistance in comprehension of the method described hereinafter. It is to be appreciated that whilst such apparatus is at this stage preferred by the applicant, the invention is in no way limited to such apparatus.

In performance of the method of this invention, in the preferred form, the meat for treatment is preferably initially exposed to anaerobic controlled conditions for sufficient length of time for most aerobic bacteria normally present on the meat during and subsequent to slaughter to be closed down.

The applicant's preferred method of achieving this objective is by treatment of the meat in bulk according to the method described in WO93/25082. However, this is in no way essential to the invention. In alternative forms of the invention, alternative means for achieving a sufficient close down of bacteria on the meat and oxygen metabolism in the meat is envisaged, including radical methods, such as irradiation and the like.

In an alternative form of the invention, pre-treatment of the meat in anaerobic conditions is not essential and that source meat for the method can be normally slaughtered and butchered meat without the anaerobic pre-treatment.

The preferred form of the method includes handling of the meat to place the meat into the packages 30 suitable for consumer sale, either as individual customer purchase packs or in so-called "gourmet" packs for subsequent limited downstream cutting and retail sale.

Preferably the pre-treated meat is handled in normal hygienic plant and apparatus, in a manner to reduce as much as possible the reintroduction of bacteria to the meat. The meat is sliced and arranged on the packages 3 such as described. The filled and covered packages 30 are placed within the chamber 7 of the container 2, or in alternative controlled environment storage apparatus.

Preferably the handling of the pre-treated meat is carried out in a low temperature working environment under 10° C. and preferably under 6° C. with the meat exposed as short a time as possible and kept as close as possible to a temperature of + or −1° C.

Once cut and arranged on the packages 30 and covered the packages 30 are arranged in the container 2 as described and the container 2 is closed to create a controllable environment in which the charged packages are held.

The chamber 7 is then gas flushed using preferably an oxygen and/or carbon dioxide enriched gas, for example in the preferred form a mixture of oxygen and carbon dioxide in a ratio of approximately 80% oxygen to 20% carbon dioxide. Other gas ratios are envisaged including oxygen in the range of ambient to 80% and carbon dioxide in a region of 0–50%. Nitrogen and other gases inert to the meat M can be utilised as a "filler" gas in the mixture, in some embodiments.

Gas flushing can be achieved by a single or series of vacuum withdrawals and subsequent pressurisations of the chamber 7, somewhat along the lines of that described in patent specification PCT/WO93/25082. The gas flushing cycle is repeated several times until such time as the controlled environment within the chamber 7 reaches a substantially free oxygen reduced environment in the preferred form of less than 500 parts per million. an upper practical limit is considered to be in the order of 50,000 parts per million or 5%.

The objective of the gas flushing is to replace sufficient gas within the chamber 7 to achieve the preferred gas mix ratio within the chamber 7.

As completion of gas flushing approaches, the chamber 7 is preferably pressurised by said oxygen and/or carbon dioxide enriched gas to a level of approximately 5 lbs per square inch over atmospheric. This pressurisation is maintained for a pre-determined period of time of between 4 hours and 10 days at a temperature of + or −1° C., that is, controlled temperatures.

It will be appreciated that in view of the gas permeable nature of the packages 30 and the method of stacking of the packages 30 within the chamber 7, the gas will permeate and diffuse through to the meat M.

The applicant has found that the pre-treatment of the meat under substantially anaerobic controlled conditions, its subsequent repackaging under relatively sterile conditions and subsequent exposure to oxygen and/or carbon dioxide enriched conditions under significant pressure, achieves adverse conditions for anaerobic and aerobic bacteria, which extends the storage life of the packed meat over traditionally refrigerated and stored pack meat. Further, the applicant contends that significantly good results can also be achieved with freshly slaughtered meat without the preferred pretreatment step.

It will be appreciated that by creating the container 2 in a substantially structural form able to withstand pressurisation, the volume of gas available to the meat for absorption is in excess of that which would normally be available at ambient pressures. In such a way, the storage life of the meat can be significantly enhanced without a danger arising during storage that the meat will have insufficient gas for absorption and that the meat, or the appearance of the meat will be adversely affected.

It will be appreciated that by pressurising the meat, the outer volume of the container 2 is kept as small as possible and enables greater efficiency, i.e. a high meat to chamber 7 ratio to be established, thus providing transportation and storage efficiencies which hitherto have not been possible.

In addition to increased shelf life provided, the applicants also say the method facilitates improved oxygenation of the meat myoglobin to render the meat bright and fresh in appearance for display purposes. The pressure enhances the depth to which the oxygen is absorbed into the meat and thus the depth in the meat to which oxygenation occurs.

It has been found by the applicant that meat treated according to this method has significantly improved shelf life and appearance over traditional methods.

In view of the portability of the apparatus 1 it is convenient for the meat process to be initially commenced in a centralised meat processing facility from slaughtering, boning, ageing and anaerobic pretreatment stages and on to packaging of the meat into the retail packages 30 housed within the controlled environment.

The packaged and contained meat can then be readily transported in refrigerated transport to, for example a supermarket or other retail establishment where the containers can be kept closed in chillers, retaining the controlled environment until such time as the product is required. The advantages provided are increased shelf life and improved product appearance and reduction of the likelihood of "product outages" in view of the convenience and lower risk of greater stock holding.

Variations and enhancements to the method envisaged include providing a means of maintaining the controlled environment at a preferred pressure and gas mix utilising a gas reservoir which may be attachable with the valve means 17, after gas flushing and during transportation and storage prior to sale. By this method the operators are able to maintain the controlled environment under substantially constant or predetermined conditions until opening of the container and in some instances after initial opening of the container where the method includes sufficient gas for repressurisation in situation where, for example, only a portion of the stored meat packages 30 are withdrawn.

Whilst in the preferred form of the invention, gas flushing is provided in a single or multiple vacuum and subsequent gas exchange method, an alternative form of the invention provides gas flushing via a valve assembly 17 having a separated gas inlet port and exhaust outlet port, so as to achieve gas flushing by a "flow through" of gas in the chamber 7.

In this alternative arrangement, it is envisaged that efficient and convenient initial separation of the inflowing gas and the exhausted gas can be achieved by positioning the gas inlet port remotely from the exhaust outlet port and by ensuring that the temperature of the inlet gas is cooler than the gas within the chamber, to resist initial mixing or diffusion of the inlet gas within the chamber 7 and thus reduce short cycling of said inlet gas to the outlet during the gas flushing phase.

In the preferred form of the invention, the range of gas pressure envisaged for the method is within a range of 1–10 lbs per square inch over atmospheric and a range of oxygen from approximately ambient to approximately 80%. The carbon dioxide level in the preferred embodiment of the invention is envisaged to range within a range of 0% to 40%.

Whilst the invention has also been described with reference to specific and pressures, it is to be appreciated that these are provided by way of example in a preferred embodiment and are in no way limiting.

The preferred embodiment of the invention includes the step of pressurising the container with the oxygen enriched gas at the time of closure and providing a sufficient volume of gas and sufficient pressure to maintain positive pressure on the chamber 7 throughout the intended storage life. This arrangement is not essential to the invention and alternative arrangements can be provided whereby a constant incremental supply of gas can be provided to the chamber 7 after the initial pressurisation to maintain, increase or reduce such pressure.

It has been found by the applicant that utilising the preferred method described hereinbefore with a controlled atmosphere of 80% oxygen and 20% carbon dioxide gas under pressure of 5 lbs per square inch over atmospheric for 24 hours at + or −1° C., a combination of low bacterial levels and excellent myoglobin oxygenation is demonstrated. Meat so treated was visually and hygienically acceptable several days after that which would hitherto been acceptable.

It is envisaged by the applicant that the method can enable pretreated pork to be packaged and stored within the controlled environment for up to 7 days without effecting retail display potential.

It will be appreciated that the gas permeability of the packages 30 and the overwrap or film 31 can vary the results achieved. The method includes at least a portion of the package having a predetermined permeability to at least oxygen and/or carbon dioxide gas tailored to the storage and subsequent shelf life characteristics of the packaged meat type and requirements of use.

Thus, this invention provides a method of treating meat in a controlled environment to achieve improved method/product handling flexibility, product quality and shelf life.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of treatment of meat comprising the steps of:
   pre-treating the meat under substantially anaerobic conditions wherein free oxygen is present in an amount of 50,000 parts per million or less for a pre-determined period of time sufficient to substantially suspend oxygen metabolism on or in the meat prior to exposure of the meat to a controlled environment of predetermined temperature and gas type which contains oxygen;
   exposing the meat to the controlled environment having the predetermined temperature and gas type; and
   holding said gas during a further predetermined period of time for meat containment in the controlled environment at a pressure in excess of atmospheric.

2. The method of treatment as claimed in claim 1, further comprising the step of providing the gas in said controlled environment at pressure levels sufficient to maintain said meat under gas pressure in excess of atmospheric pressure throughout said further predetermined period of time.

3. The method of treatment as claimed in claim 1, further comprising the step of providing an oxygen enriched gas in said controlled environment.

4. The method of treatment as claimed in claim 3, further comprising the step of additionally providing a carbon dioxide enriched gas in the controlled environment during the step of providing the oxygen enriched gas.

5. The method of treatment as claimed in claim 3, wherein the step of providing the oxygen enriched gas results in oxygen predominating in the controlled environment.

6. The method of treatment as claimed in claim 1, further comprising the step of controlling the gas type in said controlled environment wherein oxygen gas is present within a range found in ambient environment to substantially 80%.

7. The method of treatment as claimed in claim 1, further comprising the step of controlling the gas type in said controlled environment wherein a gas mix has oxygen predominating and has carbon dioxide present within a range of 0% to 40%.

8. The method of treatment as claimed in claim 1, further comprising the step of providing the controlled environment at a gas pressure in the range of 1 to 10 pounds per square inch in excess of atmospheric pressure during the further predetermined period of time.

9. The method of treatment as claimed in claim 1, further comprising the step of packaging the meat in at least partially gas permeable material during exposure of said meat to the controlled environment.

10. The method of treatment claimed in claim 1, wherein the free oxygen is present in an amount of less than 500 parts per million on the step of pre-treating the meat under substantially anaerobic conditions.

* * * * *